(12) United States Patent
Karppanen et al.

(10) Patent No.: US 10,462,237 B1
(45) Date of Patent: Oct. 29, 2019

(54) BROWSER-BASED WORKFLOWS

(71) Applicant: Amazon Technologies, Inc., Seattle, WA (US)

(72) Inventors: Jari Juhani Karppanen, Bellevue, WA (US); Kartikey Bhatt, Sammamish, WA (US); Sunitha Kalkunte Srivatsa, Seattle, WA (US); Amey Shreekant Jahagirdar, Seattle, WA (US); Jae Yoon Kim, Seattle, WA (US)

( * ) Notice: Subject to any disclaimer, the term of this patent is extended or adjusted under 35 U.S.C. 154(b) by 20 days.

(21) Appl. No.: 14/757,902

(22) Filed: Dec. 23, 2015

(51) Int. Cl.
*G06F 3/0482* (2013.01)
*H04L 29/08* (2006.01)
*G06F 16/955* (2019.01)

(52) U.S. Cl.
CPC .......... *H04L 67/22* (2013.01); *G06F 16/955* (2019.01); *H04L 67/02* (2013.01)

(58) Field of Classification Search
CPC .. G06Q 10/06; G06Q 10/06316; H04L 67/02; G06F 3/0482
See application file for complete search history.

(56) References Cited

U.S. PATENT DOCUMENTS

| | | | |
|---|---|---|---|
| 7,886,264 B1 * | 2/2011 | Peyton | G06F 8/34 709/201 |
| 8,639,555 B1 * | 1/2014 | Johnston | G06Q 10/0631 705/7.27 |
| 8,694,355 B2 * | 4/2014 | Bui | G06N 5/022 705/7.27 |
| 9,396,259 B1 * | 7/2016 | Yuhan | |
| 9,582,779 B1 * | 2/2017 | Bevan | G06Q 10/0633 |
| 9,715,675 B2 * | 7/2017 | Chakravarty | G06Q 10/06 |
| 2007/0288589 A1 * | 12/2007 | Chen | G06F 17/30902 709/217 |
| 2009/0316202 A1 * | 12/2009 | Ueda | H04N 1/00411 358/1.15 |
| 2012/0079395 A1 * | 3/2012 | Bengualid | G06F 17/30899 715/745 |
| 2013/0006897 A1 * | 1/2013 | Jain | G06N 5/022 706/12 |
| 2013/0208966 A1 * | 8/2013 | Zhao | G06F 9/5072 382/131 |
| 2013/0282817 A1 * | 10/2013 | Montgomery | H04L 67/22 709/204 |

(Continued)

*Primary Examiner* — Oanh Duong
(74) *Attorney, Agent, or Firm* — BakerHostetler

(57) ABSTRACT

Techniques for browser-based workflows are described herein. In some examples, various actions performed within a web browsing application may be tracked. The tracked actions may include actions such as entering a page address, loading a page, entering a search term, entering identity authentication information, selecting a link, selecting an input element, and other actions. A set of actions included within the tracked actions may be selected for association with a workflow, for example based on a determination that the set of actions has been performed at least twice. In some examples, the set of actions associated with the workflow may include loading a page and performing one or more actions on the loaded page. Information indicating the workflow and its associated set of actions may be stored. Upon receiving a request to execute the workflow, the information may be retrieved, and the associated set of actions may be performed.

13 Claims, 15 Drawing Sheets

(56) References Cited

U.S. PATENT DOCUMENTS

| | | | |
|---|---|---|---|
| 2014/0278716 A1* | 9/2014 | Nix | G06Q 10/06316 |
| | | | 705/7.26 |
| 2014/0282367 A1* | 9/2014 | Harrill | G06F 8/31 |
| | | | 717/105 |
| 2014/0297353 A1* | 10/2014 | Srivastava | G06Q 10/06316 |
| | | | 705/7.26 |
| 2014/0304836 A1* | 10/2014 | Velamoor | G06F 21/6209 |
| | | | 726/28 |
| 2014/0365579 A1* | 12/2014 | Thrasybule | H04L 67/26 |
| | | | 709/205 |
| 2015/0163206 A1* | 6/2015 | McCarthy | G06F 21/6227 |
| | | | 713/171 |
| 2015/0170088 A1* | 6/2015 | Rizk | G06F 8/34 |
| | | | 705/7.26 |
| 2015/0347935 A1* | 12/2015 | Standing | G06Q 10/0633 |
| | | | 705/7.27 |
| 2016/0048574 A1* | 2/2016 | Avery | G06F 17/241 |
| | | | 707/740 |
| 2016/0142541 A1* | 5/2016 | Sharpe | H04M 3/5141 |
| | | | 379/92.01 |

* cited by examiner

BROWSER-BASED WORKFLOWS

BACKGROUND

In recent years, use of the Internet has expanded rapidly, enabling retrieval of a vast quantity and variety of information. Due in part to the fast pace of life in the information age, many Internet users place a high value on the ability to retrieve information quickly and efficiently. One characteristic associated with browsing of the Internet is that various users may often repeatedly access a particular web page or other collection of information, sometimes weekly, daily, or even several times per day. For example, users may repeatedly access a particular web page in order to access different links or other information that may be posted on the web page, and which may sometimes be continually updated or changed. One problem related to this repeated access of information is that a user may often be forced to repeat a particular set of actions each time that the user wishes to return to the information. One specific example of such a repeated set of actions may include selecting an address bar and entering a uniform resource locator (URL) for a website logon page, loading of the website logon page, selecting various text input elements for a username and password, entering a username and password into the selected text input elements, loading of a search page, selecting a text input element for entering search terms, entering search terms into the selected text input element, and loading a search results page. In some examples, a user may be required to repeat a set of actions such as those described above each time that a user wishes to return to a particular webpage. Requiring users to continually repeat the same set of actions may waste valuable time, become frustrating to users, and may ultimately discourage users from visiting various websites or from performing various tasks on the Internet.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
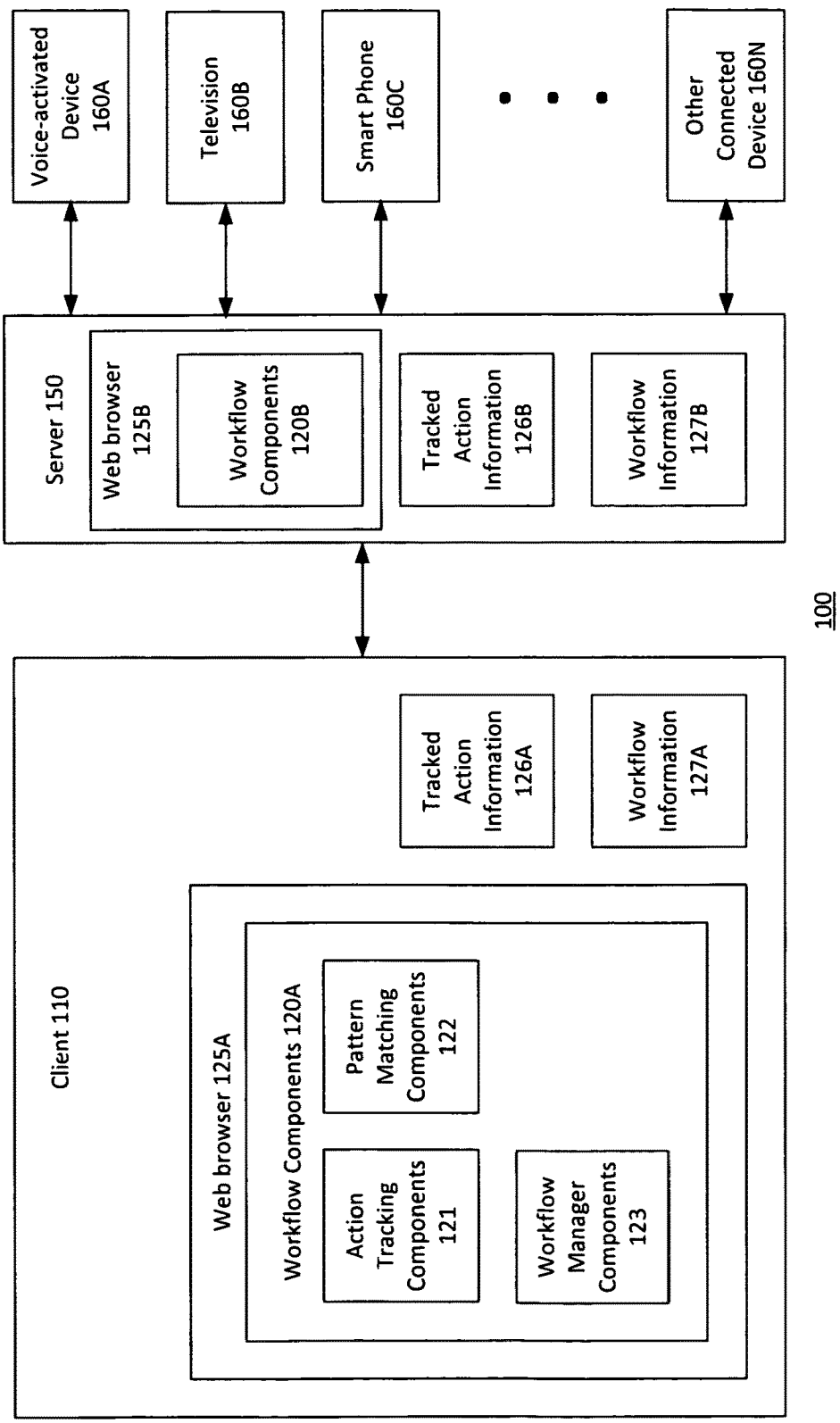
FIG. 1 is a diagram illustrating an example system for browser-based workflows that may be used in accordance with the present disclosure.

Techniques for implementation of browser-based workflows are described herein. In some examples, various actions performed within a web browsing application may be tracked. The tracked actions may include actions such as entering a uniform resource locator (URL) or other resource locator, loading a page, entering a search term, entering identity authentication information (e.g., username, password, etc.), selecting a link, selecting an input element (e.g., text input element, button, drop down menu, etc.), entering information using an input element, and other browser-associated actions. In some examples, the tracked actions may include user-performed actions (e.g., selecting a text input element and entering text therein) as well as browser-performed actions (e.g., loading a webpage).

In some examples, a set of actions included within the tracked actions may be selected for association with a browser-based workflow. An associated set of actions may include any set of tracked actions, such as loading one or more pages and performing various additional actions on the loaded pages (e.g., entering text for searching, usernames, passwords, input element selections, link selections, etc.). Various different techniques may be employed to select and associate tracked actions with a workflow. In one particular example, various sets of tracked actions may be compared to one another to identity patterns, for example sets of tracked actions that are performed at least twice, such as at least twice in a day, week, or at any other selected frequencies and/or quantities. Upon identifying such a repeated set of actions, the repeated set of actions may be indicated to the user, and the user may be presented with the option of requesting that the repeated set of actions be associated with a workflow. In another particular example, a user may perform actions within the browser, and, upon completion of performance of the actions, the user may request that the recently performed actions be associated with a workflow. In some examples, a listing or other indication of recently performed actions may be presented to the user, enabling the user to select various actions for association with a workflow.

In some examples, information may be stored indicating a designated workflow and its associated set of actions. Additionally, in some examples, one or more controls may be exposed, within the browser, which allow a workflow to be requested and executed. For example, in some cases, a workflow may be requested for execution using a browser options menu or other similar controls. Upon being requested for execution, the set of actions associated with the requested workflow may be identified, for example based on the stored information for the workflow, and the associated set of actions may then be performed by the browser. Thus, in some examples, the workflow may allow an associated set of multiple actions to be performed using only a single request to execute the workflow. As should be appreciated, this may be advantageous by, for example, reducing the time, complexity, and inconvenience associated with repetition of prior performed actions. For example, in some cases, a workflow may include actions involving text entry, such as entry of URL's or other resource locators, search terms, usernames, passwords and other types of textual input. In these cases, the workflow may eliminate the need for the user to repeatedly type or otherwise input textual information. As another example, in some cases, a workflow may include actions involving selection of links or other elements on one or more web pages. In these cases, the workflow may eliminate the need for the user to manually scroll, navigate, or otherwise search through a page to manually find and select the desired elements. As yet another example, in some cases, the workflow may be selected using a device that may not include a web browser, such as some voice-activated devices. In some examples, the workflow may be requested, for example via a verbal command to a voice-activated device, and then executed on another device, such as a device that executes a web browser, and results of the workflow execution may then be returned to the user, for example verbally or via display on another device.

As yet another example, in some cases, data regarding a prior state of a particular webpage associated with a workflow may also be saved in association with the workflow. In some examples, when a workflow results in navigation to the particular webpage, the prior state data for the webpage may be accessed to determine and identify various changes to the webpage that have occurred since a prior navigation to the webpage (e.g., added or deleted links, text, images, etc.). The user may then be notified of various changes to the webpage and asked if any particular actions are desired in view of the changes. For example, a user may be notified that a new link has been added to a webpage and may be asked if he wishes to access the newly added link. This may save time and improve efficiency by, for example, allowing users to quickly identify and focus on changed information, which may often not otherwise be readily apparent to the users.

FIG. 1 is a diagram illustrating an example system 100 for browser-based workflows that may be used in accordance with the present disclosure. As shown in FIG. 1, system 100 includes a client 110 executing a web browser 125A that includes workflow components 120A. Client 110 may be a compute node and/or device, such as a desktop or laptop computer, tablet, smart phone, television, and many others. It is noted that, while FIG. 1 depicts workflow components 120A as being included within web browser 125A, any or all functionality attributed to workflow components 120A may also be performed by components external to a web browser. In some examples, any or all of workflow components 120A may be included and distributed (e.g., made available for download or otherwise provided) in combination with web browser 125A, may be added to and/or associated with web browser 125A as add-ons or other associated components, or may otherwise be provided and made available for interaction and communications with web browser 125A.

Generally, workflow components 120A enable or help to enable generation, management, and performance of browser-based workflows and associated operations. In the particular example of FIG. 1, workflow components 120A include action tracking components 121, pattern matching components 122, and workflow manager components 123. Action tracking components 121 may generally monitor web browser 125A to track various actions performed within web browser 125A. The tracked actions may include actions such as entering a uniform resource locator (URL) or other resource locator, loading a page, entering a search term, entering identity authentication information (e.g., username, password, etc.), selecting a link, selecting an input element (e.g., text input element, button, drop down menu, etc.), entering information using an input element, and other browser-associated actions. In some examples, the tracked actions may include user-performed actions (e.g., selecting a text input element and entering text therein) as well as browser-performed actions (e.g., loading a webpage).

Figure 2:
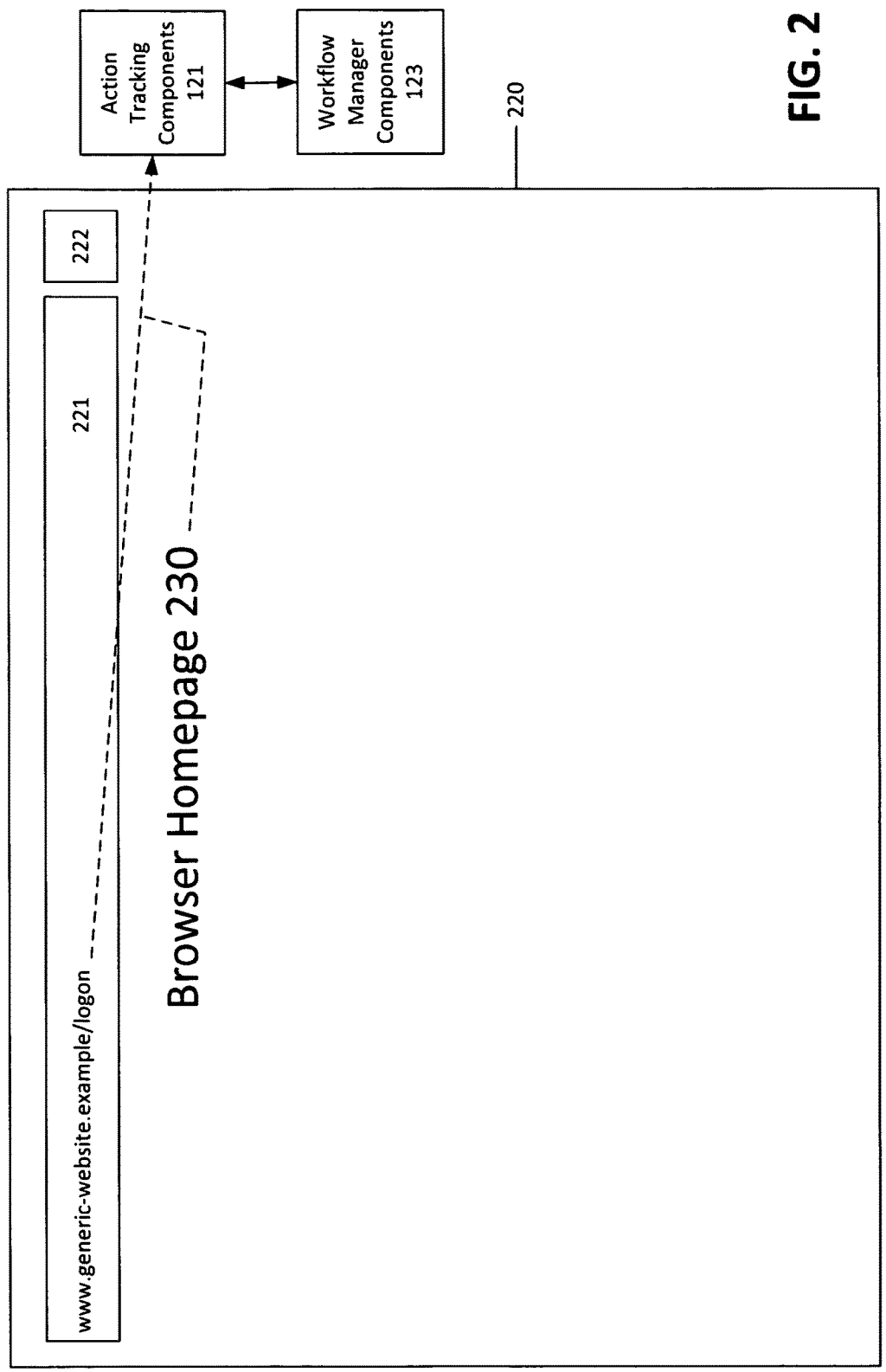
FIG. 2 is a diagram illustrating a first example of tracked actions that may be used in accordance with the present disclosure.
Figure 3:
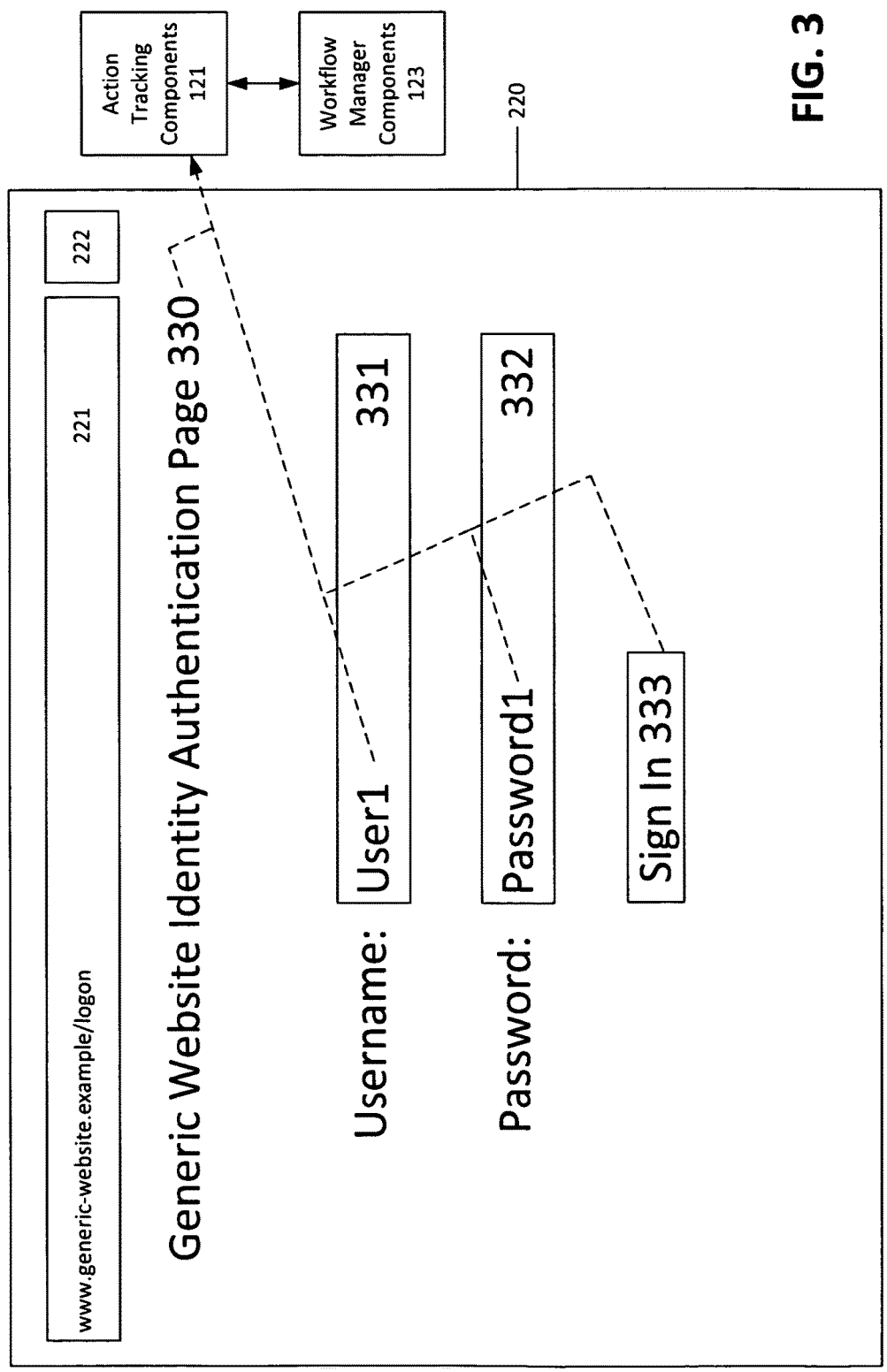
FIG. 3 is a diagram illustrating a second example of tracked actions that may be used in accordance with the present disclosure.

Some specific examples of tracked actions will now be described in detail with reference to FIGS. 2-5. In particular, referring now to FIG. 2, it is seen that a browser interface 220 may interact, directly and/or indirectly, with action tracking components 121 and workflow manager components 123 and possibly any number of other components (not shown). As shown in FIG. 2, browser interface 220 displays a browser homepage 230, which is a page that may be displayed initially upon opening of web browser 125A. As also shown in FIG. 2, browser interface 220 includes an address bar 221 and an options menu button 222. Address bar 221 may, for example, allow a web page address, such as a URL, to be entered into web browser 125A, which may cause web browser 125A to navigate to the requested entered web page. Options menu button 222, may allow various browser options to be requested, some examples of which are described in detail below. As should be appreciated, a browser interface for use in accordance with the disclosed techniques may also include any number of additional or alternative controls or other features. As shown in FIG. 2, a particular webpage address (www.generic-website.example/logon) has been entered into the address bar 221. Thus, in the example of FIG. 2, action tracking components may track a number of example actions associated with web browser 125A. For example, in some cases, action tracking components 121 may track an action of loading the browser homepage 230, a next action of selecting the address bar 221, and a next action of entering a particular webpage address (www.generic-website.example/logon) into the address bar 221 (which may include, for example, typing the address and pressing the enter key). In the example of FIG. 3, a dashed arrow is depicted from browser homepage 230 and address bar to 221 action tracking components 121 to indicate that the loading of browser homepage 230, the selecting of address bar 221, and the entering of the www-.generic-website.example/logon website address are example actions that may be tracked by action tracking components 121.

Entering of the www.generic-website.example/logon address into address bar 221 may cause the web browser 125A to navigate to the webpage associated with that address. Referring now to FIG. 3, it is seen that the web browser 125A has navigated to the webpage associated with the www.generic-website.example/logon address, which is generic website identity authentication page 330 displayed in browser interface 220. As shown in FIG. 3, generic website identity authentication page 330 includes a Username text input element 331, a Password text input element 332, and a Sign In button 333. As also shown in FIG. 3, a user has selected Username text input element 331 and entered therein a particular username (User1). Additionally, the user has selected Password text input element 332 and entered therein a particular password (Password1). Finally, the user has selected the Sign In button 333 to cause the entered username and password to be submitted to the respective website. Thus, in the example of FIG. 3, action tracking components may track a number of example actions associated with web browser 125A. For example, in some cases, action tracking components 121 may track an action of loading the generic website identity authentication page 330, a next action of selecting the Username text input element 331, a next action of entering text (User1) into the Username text input element 331, a next action of selecting the Password text input element 332, a next action of entering text (Password 1) into the Password text input element 332, and a next action of selecting Sign In button 333. In the example of FIG. 3, a dashed arrow is depicted from generic website identity authentication page 330, text input elements 331 and 332, and button 333 to action tracking components 121 to indicate that the loading of generic website identity authentication page 330, the selecting of text input elements 331 and 332, the entry of text therein, and the selection of button 333 are example actions that may be tracked by action tracking components 121.

Figure 4:
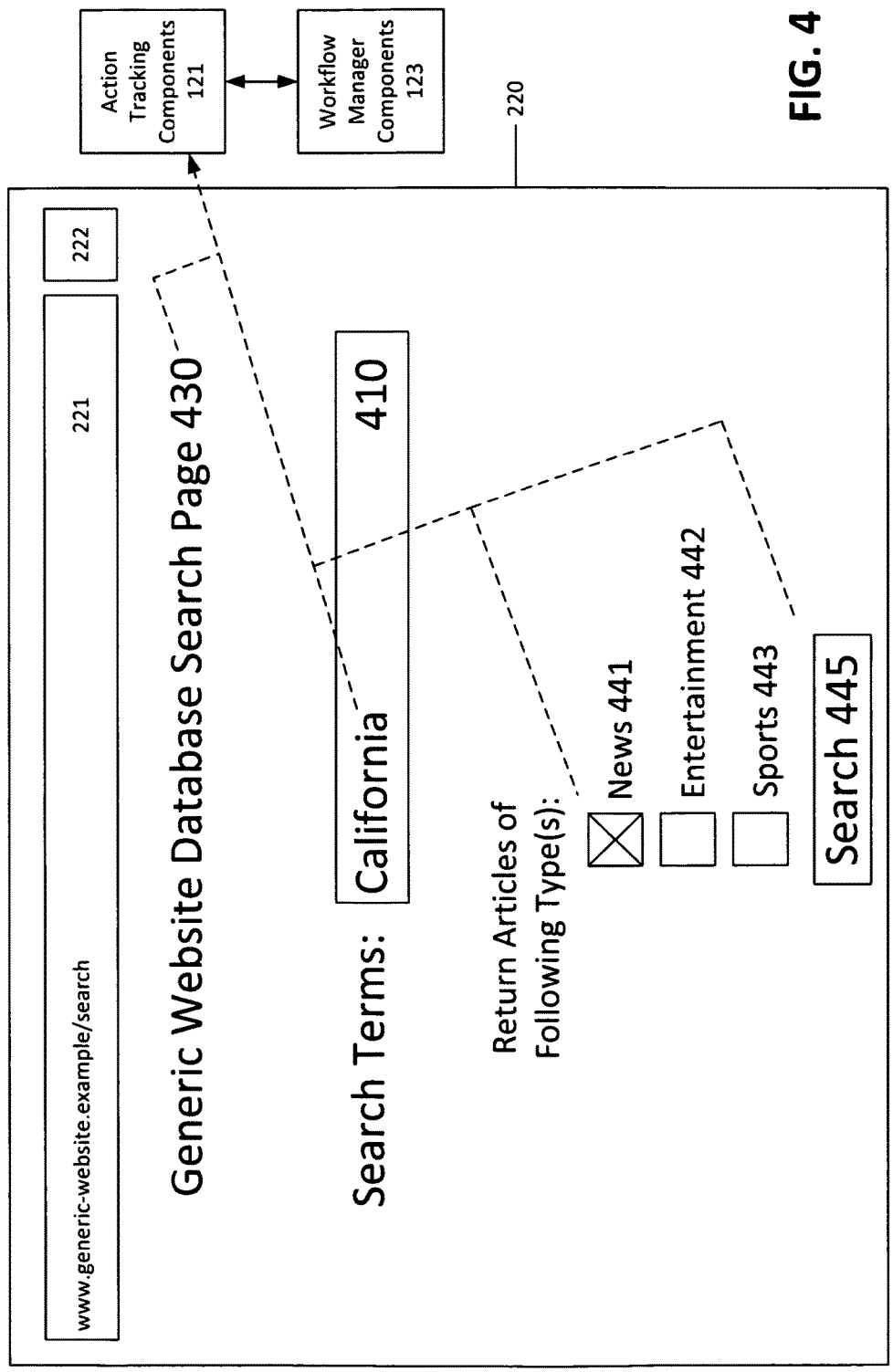
FIG. 4 is a diagram illustrating a third example of tracked actions that may be used in accordance with the present disclosure.

Selecting of the Sign In button 333 in FIG. 3 may cause the username and password entered in FIG. 3 to be submitted to a respective website which may attempt to validate the submitted username and password combination in order to authenticate the user. If the user is successfully authenticated (e.g., if the submitted username and password combination is validated), then the user may be granted access to a webpage to which the user is requesting access. Referring now to FIG. 4, it is seen that the web browser 125A has navigated to the webpage to which the user is requesting access, which is generic website database search page 430 displayed in browser interface 220. The URL for page 430 is www.generic-website.example/search, which is displayed in address bar 221 of FIG. 4. As shown in FIG. 4, generic website identity authentication page 330 includes a Search Terms text input element 410, a News checkbox 441, an Entertainment checkbox 442, a Sports checkbox 443, and a Search button 445. As also shown in FIG. 4, a user has selected Search Terms text input element 410 and entered therein a particular search term (California). Additionally, the user has selected News checkbox 441 (as indicated by the X symbol in News checkbox 441). Finally, the user has selected the Search button 445 to cause the a request to be submitted to the respective website to perform a database search for news articles associated with California and to return the corresponding search results. Thus, in the example of FIG. 4, action tracking components 121 may track a number of example actions associated with web browser 125A. For example, in some cases, action tracking components 121 may track an action of loading the generic website database search page 430, a next action of selecting the Search Terms text input element 410, a next action of entering text (California) into the Search Terms text input element 410, a next action of selecting the News checkbox 441, and a next action of selecting Search button 445. In the example of FIG. 4, a dashed arrow is depicted from generic website database search page 430, text input element 410, checkbox 441, and button 445 to action tracking components 121 to indicate that the loading of generic website database search page 430, the selecting of text input element 410 and the entry of text therein, the selection of checkbox 441, and the selection of button 445 are example actions that may be tracked by action tracking components 121.

Figure 5:
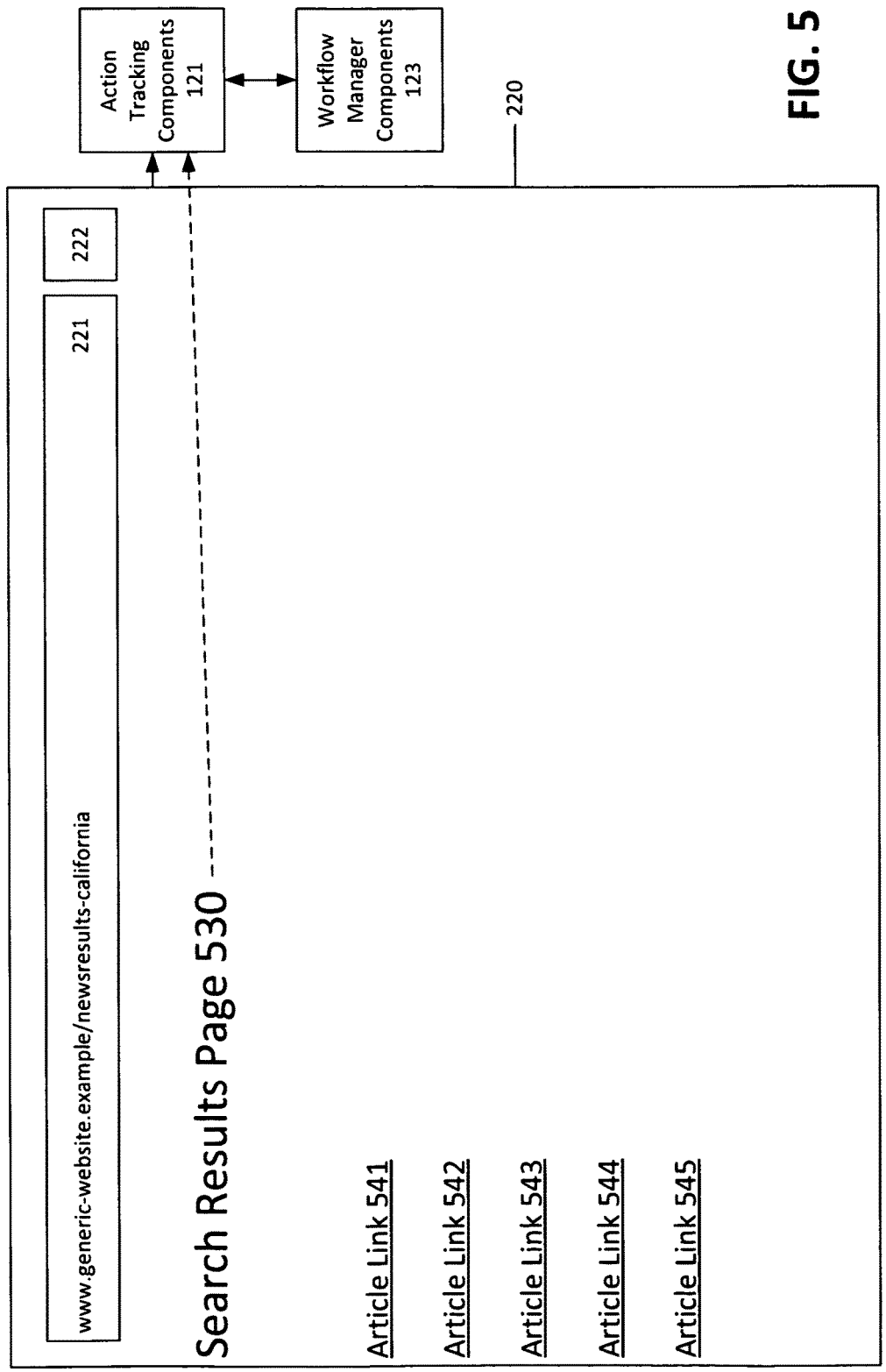
FIG. 5 is a diagram illustrating a fourth example of tracked actions that may be used in accordance with the present disclosure.

Selecting of the Search button 445 in the example of FIG. 4 may cause the a request to be submitted to the respective website to perform a database search for news articles associated with California and to return the corresponding search results. Referring now to FIG. 5, it is seen that the web browser 125A has loaded search results page 530, which is a webpage that includes search results for the search requested in the example of FIG. 4 (i.e., news articles associated with California). The URL for page 530 is www.generic-website.example/newsresults-california, which is displayed in address bar 221 of FIG. 5. As shown in FIG. 5, search results page 530 includes links 541-545 to five different articles regarding news associated with California. As should be appreciated, each article may be accessed by selecting a respective one of links 541-545. In the example of FIG. 5, action tracking components 121 have tracked an action of loading the search results page 530, which is indicated by the dashed arrow depicted from search results page 530 to action tracking components 121.

Thus, as described above, FIGS. 2-5 depict various example actions that may be tracked by action tracking components 121. In some examples, information associated with actions that are tracked by action tracking component 121 may be stored in tracked action information 126A. In some examples, the tracked action information 126A may include an indication of the actions in the group of actions and an order of performance of the actions in the group of actions, such as an order of performance of each action in the group of actions relative to one or more other actions in the group of actions. Also, in some examples, the tracked action information 126A may include, for one or more tracked actions, an indication of an action type (e.g., page loading, element selection, text or other information entry, etc.), an indication of an associated element (e.g., address bar, text input element, checkbox, button, etc.) an indication of associated entered information (e.g., entered text), a time associated with performance of the action, and other information. In some examples, information stored in tracked action information 126A regarding prior tracked actions may be maintained for a configurable time period and then deleted, for example to allow additional storage capacity for information related to current and future tracked actions.

In some examples, tracked action information 126A may be accessed by pattern matching components 122, which may examine information associated with tracked actions to identify patterns, for example sets of tracked actions that are performed repeatedly (i.e., at least twice), such as at least twice in a day, week, or at any other selected frequencies and/or quantities. In some examples, pattern matching components 12 may be configured to search for patterns of tracked actions that match specified criteria, such as patterns that have occurred at least a specified amount of times within a specified time period. A variety of techniques may be employed to examine tracked action information 126A and identify patterns of tracked actions. For example in some cases, upon loading of a particular webpage by web browser 125A, pattern matching components 122 may search tracked action information 126A for other prior tracked actions occurring within, or in association with, the loaded webpage. As another example, in some cases, upon tracking that a particular element (e.g., text entry element, checkbox, button, etc.) has been selected, pattern matching components 122 may search tracked action information 126A for other prior tracked selections or interactions with that particular element. As yet another example, in some cases, upon tracking that particular text (e.g., username, password, search term, etc.) has been entered, pattern matching components 122 may search tracked action information 126A for other prior tracked entries of that particular text. In some examples, certain variations between matched patterns may be acceptable. For example, referring back to FIG. 2, if a user were to select and enter text into Password text input element 332 prior to selecting and entering text into Username text input element 331, this may sometimes considered to match other sets of actions in which the order was reversed and the user selects and enters text into Password text input element 332 after selecting and entering text into Username text input element 331. These action sets may be considered to match (even though their order is different) because the end result of the actions is similar (i.e., entry of authentication information).

Figure 6:
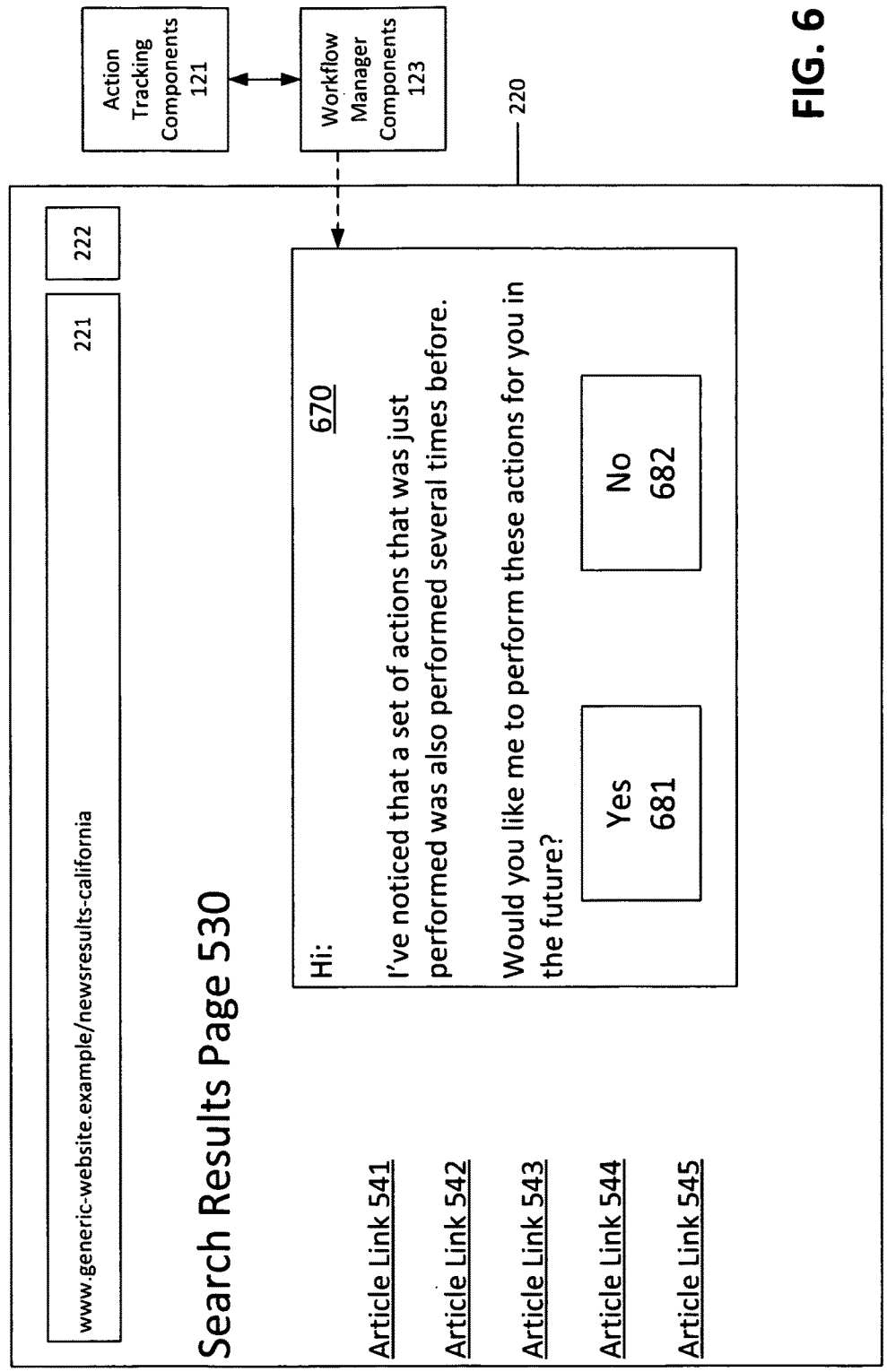
FIG. 6 is a diagram illustrating an example pattern matching-based workflow generation interface that may be used in accordance with the present disclosure.

In some examples, upon identifying a repeated set of tracked actions, pattern matching components 122 may identify the repeated set of actions to workflow manager components 123, which may, in some examples, associate the repeated set of actions with a workflow. In some examples, in order to determine whether to associate a repeated set of actions with a workflow, workflow manager components 123 may request input from a user regarding whether to associate the repeated set of actions with a workflow. In particular, referring now to FIG. 6, an example of such a request for input from the user will now be described in detail. Specifically, FIG. 6 provides an example in which various recent tracked actions, in this case the tracked actions depicted in FIGS. 2-5 and described above, are identified as a repeated set of tracked actions. Based on this identified repetition of actions, workflow manager components 123 have generated a dialog box 670 that is displayed within browser interface 220. In the example of FIG. 6, the dialog box 670 indicates that a set of actions that has just been performed was also performed several times before. The dialog box 670 then asks the user if the user would like the web browser 125A to perform these actions for the user in the future. If the user selects the No button 682, then the set of actions may not be associated with a workflow. Additionally, workflow manager components 123 may store a record of the user declining to have the set of actions associated with a workflow so that the user is not asked this question again in the future. By contrast, if the user selects the Yes button 681, then workflow manager components 123 may respond by associating the set of actions with a workflow, as will be described in detail below.

Figure 7:
FIG. 7 is a diagram illustrating an example request-based workflow generation interface that may be used in accordance with the present disclosure.

Thus, as described above, a set of actions may sometimes be associated with a workflow based, at least in part, on a determination that the set of actions is a repeated set of actions or otherwise matches a pattern of actions. A number of other factors may also cause a set of actions to be associated with a workflow. For example, in some cases, even when a set of actions may not necessarily match other previously performed actions, a user may nevertheless request for the set of actions to be associated with a workflow. In some cases, web browser 125A may expose one or more menu options or other controls that allow a user to request that a set of actions be associated with a workflow. Referring now to FIG. 7, an example is illustrated in which a user issues such a request using a menu option. In particular, as shown in FIG. 7, the user selects browser options menu button 222, which, in turn, triggers a display of browser options menu 722. Upon display of the browser options menu 722, the user selects Add Workflow option (as indicated by the horizontal lines above and below the Add Workflow option in browser options menu 722). The selection of the Add Workflow option provides an indication that the user wishes to have a new workflow generated and to have a set of actions be associated with the newly generated workflow. As shown in FIG. 7, a notification of the selection of the Add Workflow option may be provided to workflow manager components 123 (as indicated by the arrow from the add workflow option to workflow manager components 123).

Figure 8:
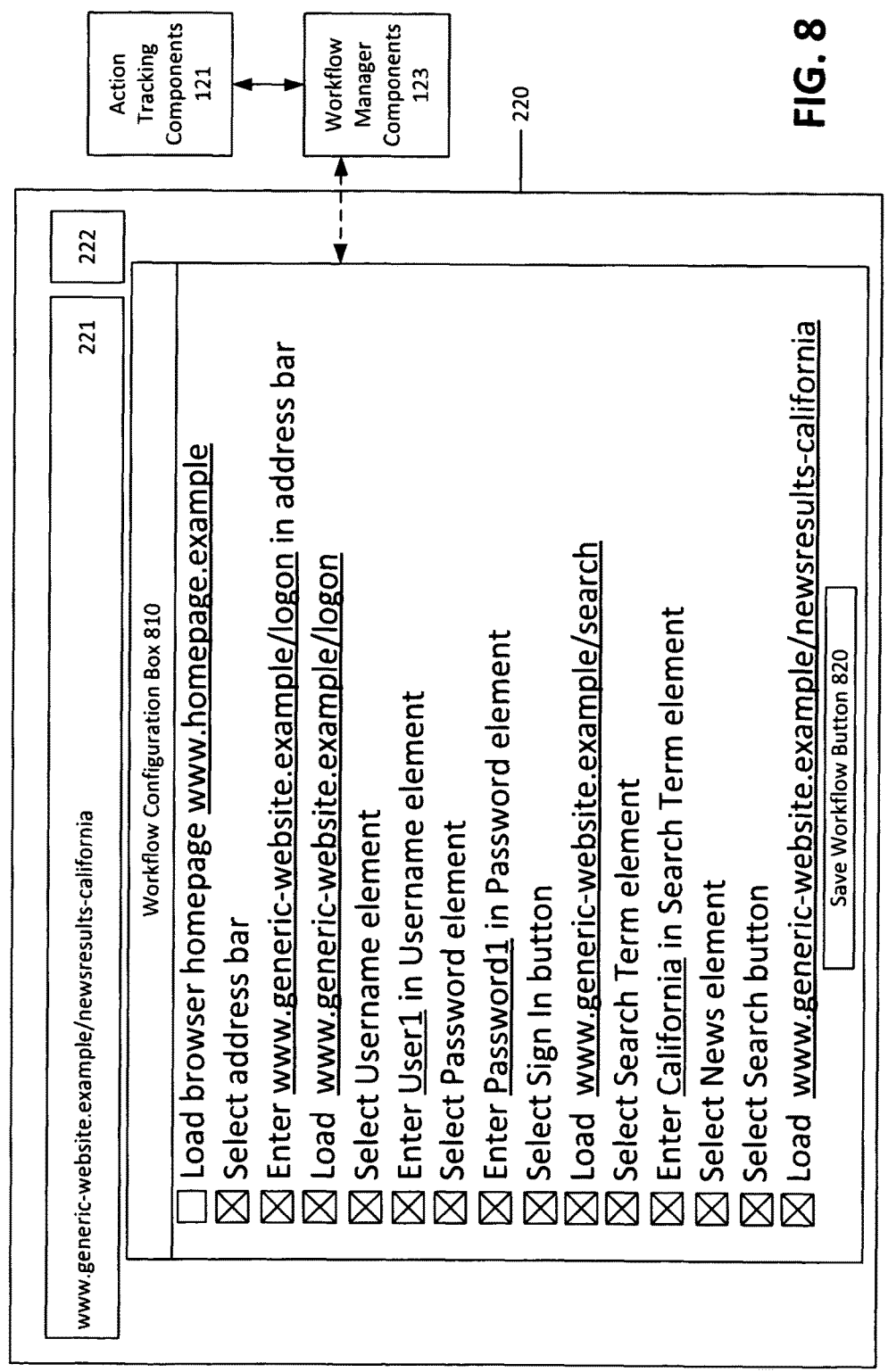
FIG. 8 is a diagram illustrating a first example workflow action listing that may be used in accordance with the present disclosure.

In some examples, upon being notified that the Add Workflow option is selected, workflow manager components may enable various actions to be selected for association with the requested new workflow. Referring now to FIG. 8, in response to selection of the Add Workflow option, workflow manager components 123 cause a workflow configuration box 810 to be generated and displayed within browser interface 220. The workflow configuration box 810 allows various recently tracked actions to be selected for association with a requested workflow. In particular, in the example of FIG. 8, workflow configuration box 810 displays a listing of the tracked actions depicted and described above with reference to FIGS. 2-5. Additionally, box 810 includes a number of checkboxes each associated with a respective tracked action that is listed to the right of the checkbox. In the example of FIG. 8, the user may request that an action be associated with the workflow by checking (or not unchecking) the action's respective checkbox. By contrast, the user may request that an action not be associated with the workflow by unchecking (or not checking) the action's respective checkbox. As shown, in the example of FIG. 8, the first listed action to load the browser homepage is unchecked and will not be associated with the workflow, while the remaining listed actions are checked and will be associated with the workflow.

It is noted that, in addition to being displayed in response to a user request to add a workflow, an action listing and selection interface such as shown in FIG. 8 may also be displayed in response to a pattern matching or repeated action matching determination made by pattern matching components 122 or in response to other determinations or conditions. Thus, for example, in addition to being displayed in response to the add workflow option in browser options menu 722 of FIG. 7 (or other similar selections), the workflow configuration box 810 may also be displayed in response to selection of the Yes button 681 of FIG. 6 (or other similar selections).

It is also noted that, in some examples, an interface such as box 810 may also be displayed in order to allow an existing workflow to be edited, such as by changing (e.g., adding, removing, and/or modifying) the actions that are associated with the workflow. For example, in some cases, box 810 may be displayed in response to a selection of the Edit Workflow option in browser options menu 722 of FIG. 7 (or other similar selections). As a specific example, if a user's password were changed from Password1 to Password2, the user could modify the workflow by selecting the Edit Workflow option in browser options menu 722 of FIG. 7, which may result in the re-display of box 810 of FIG. 8. The user may then select the "Enter Password1 in Username element" action listed in box 810 and change the password from Password1 to Password2 (for example by selecting and highlighting the text "Password1" and then typing "Password2"). This would allow the user's password to be changed without having to re-perform the entire set of actions.

Upon checking or otherwise requesting actions for association with a workflow, a user may select the Save Workflow button 820, which may cause an indication of the actions selected in box 810 to be sent to workflow manager components 123, which may then associate the checked or otherwise selected actions with the newly added workflow. In some examples, workflow manager components 123 may then store information associated with the newly added workflow in workflow information 127A of FIG. 1. In some examples, the stored workflow information for the new workflow may include an indication of an association between the new workflow and its associated set of actions. Also, in some examples, the stored workflow information for the new workflow may include an indication of an order of performance of the actions in the associated set of actions, such as an order of performance of each action in the set of actions relative to one or more other actions in the set of actions. The stored workflow information for the new workflow may also include, for example, a name and identifier for the new workflow, and descriptions of the actions associated with the workflow, such as an action type (e.g., page loading, element selection, text or other information entry, etc.), an indication of an associated element (e.g., address bar, text input element, checkbox, button, etc.) an indication of associated entered information (e.g., entered text), and other information.

Figure 9:
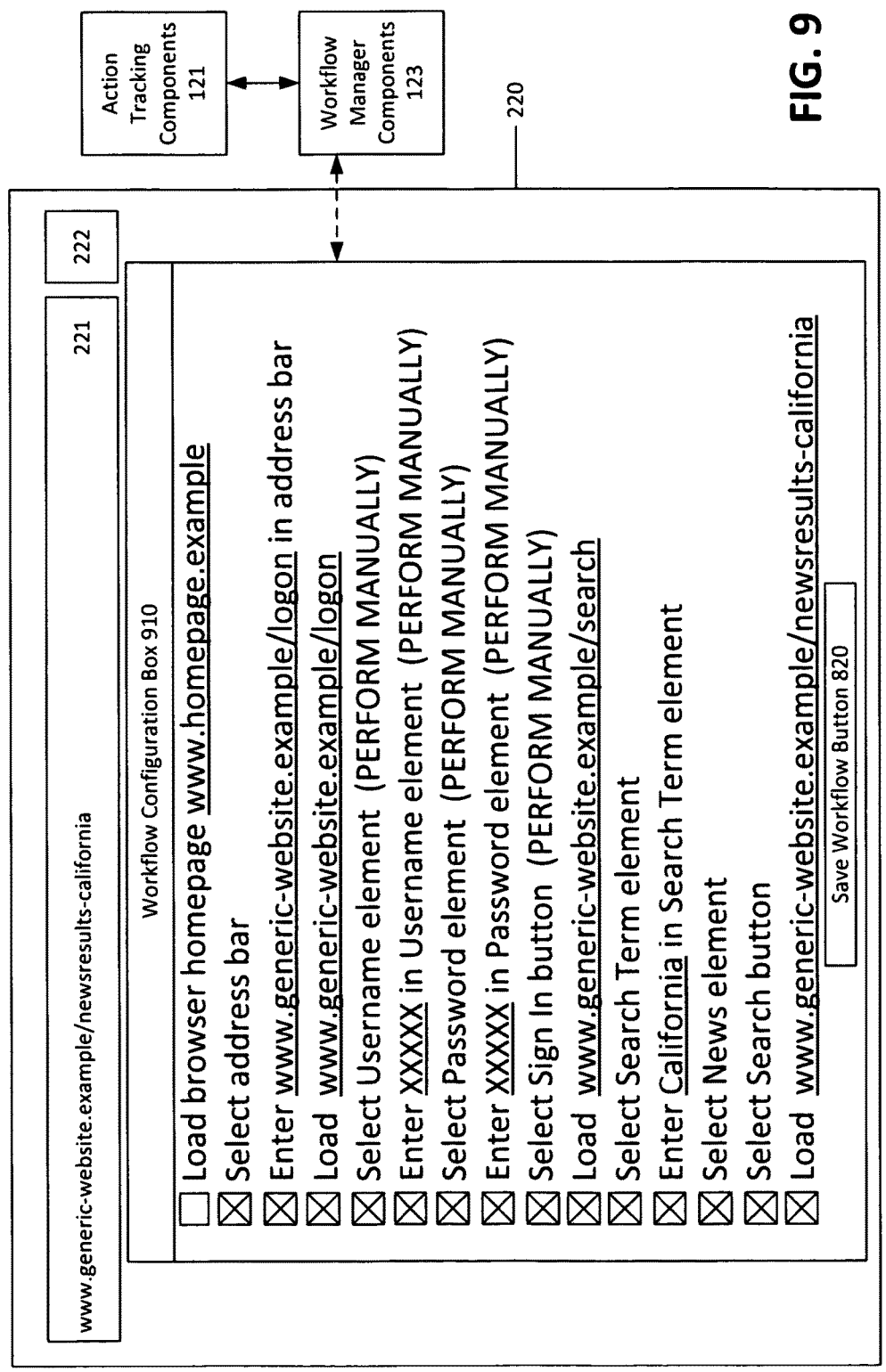
FIG. 9 is a diagram illustrating a second example workflow action listing that may be used in accordance with the present disclosure.

It is noted that, in some examples, a user may wish to manually perform one or more actions that are associated with a particular workflow. One particular case in which a user may sometimes wish to manually perform certain actions is when the actions involve sensitive or other personal information that a user may not feel comfortable having stored in association with the workflow, such as identity authentication information (e.g., usernames and passwords), or other personal information. An example in which certain actions associated with a workflow are performed manually is shown in FIG. 9. As shown, FIG. 9 includes a workflow association box 910, which is identical to workflow association box 810 of FIG. 8 with the exception that five intermediate actions related to entry and submission of a username and password have been modified. In particular, these five steps now have the words (PERFORM MANUALLY) displayed to their right side to indicate that these actions will be performed manually by a user. In some examples, a user may designate these actions for manual performance by, for example, right clicking on the respective action listing with a mouse and selecting a perform manually option from a pop-up menu (or using any other suitable option selection technique). Additionally, in box 910, it is noted that the username shown for entry in the Username element has been changed from User1 (as shown in box 810 of FIG. 8) to XXXXX. Furthermore, in box 910, it is noted that the password shown for entry in the Password element has been changed from Password 1 (as shown in box 810 of FIG. 8) to XXXXX. The changing of the displayed username and password in box 910 to XXXXX indicates to the user that the username and password for the user will not be stored in association with the saved workflow, which may give the user greater confidence that his personal information may be protected. Additionally, the manual performance of these actions may also be advantageous, in some examples, because it may allow the saved workflow to be selected and used by other users that may have differing usernames and passwords from the user that initially created the workflow.

It is noted that other additional or alternative techniques may also be employed for allowing users to enter information in association with a workflow. As a specific example, in some cases, when a user selects to have entry of a username, password, or other information associated with a workflow, the user may be given the option to enter any or all of this information at the time that the workflow is requested for execution. In particular, when the workflow is requested for execution, the user may be prompted to enter this information prior to initiation of execution of the workflow. The information may then be entered into the browser automatically, for example by the workflow manager components 123, at the appropriate time (e.g., when the appropriate page is loaded). In some examples, this technique may be advantageous because it may allow users to enter their own information in association with a workflow without having to break the flow of the performance of the workflow to perform actions manually once execution of the workflow is initiated.

Figure 10:
FIG. 10 is a diagram illustrating an example workflow execution request interface that may be used in accordance with the present disclosure.

Thus, as set forth above, workflow components 120A and web browser 125A may coordinate to allow workflows to be generated and to have sets of actions associated therewith. Additionally, workflow components 120A and web browser 125A may coordinate to allow workflows to be requested by a user for execution and to responsively be executed in association with web browser 125A. For example, in some cases, web browser 125A may expose one or more menu options or other controls that allow an existing workflow to be requested for execution. Referring now to FIG. 10, an example is depicted in which a particular existing workflow is requested for execution using a browser options menu. As shown in FIG. 10, a user has selected browser options menu button 222, which, in turn, causes browser options menu 722 to be displayed. Subsequently, from browser options menu 722, the user has selected the Execute Workflow option (as indicated by the horizontal lines above and below the Execute Workflow option in browser options menu 722). This, in turn, causes workflow selection sub-menu 1022 to be displayed, which allows the user to select a particular existing workflow for execution. In the example of FIG. 10, the user has selected Workflow C (as indicated by the horizontal lines above and below the Workflow C option in sub-menu 1022).

The selection of the Workflow C option in sub-menu 1022 may then be indicated to workflow manager components 123, which may then execute Workflow C. In some examples, workflow manager components 123 may execute and/or may cause a web browsing application to execute Workflow C by accessing workflow information 127A to retrieve information associated with Workflow C, such as information indicating the set of actions that is associated with Workflow C and an order of performance of the set of actions. For example, in the case where Workflow C corresponds to the workflow whose actions are selected using workflow configuration box 810 of FIG. 8, the actions associated with Workflow C may include the actions that are selected and checked in workflow configuration box 810. Workflow manager components may then retrieve indications of these selected actions (including, for example, the order in which they are to be performed) from workflow information 127A and execute and/or cause to be executed the actions in the appropriate order (e.g., the order shown in box 810 with the actions being performed first to last from the top down). As should be appreciated, performing of these actions in the appropriate sequence may result in search results page 530 of FIG. 5 again being loaded and displayed to the user.

Figure 11:
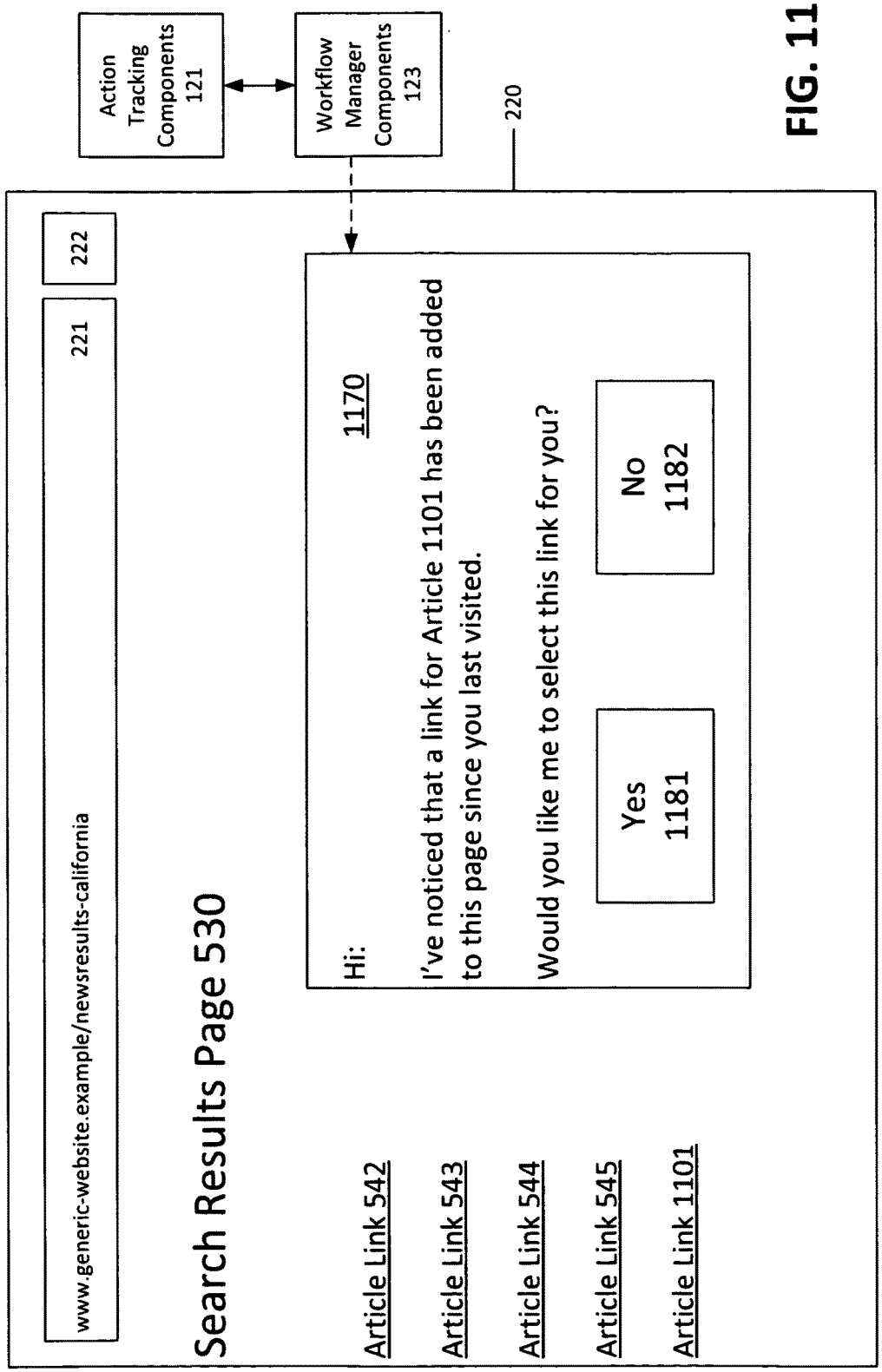
FIG. 11 is a diagram illustrating an example page modification indication box that may be used in accordance with the present disclosure.

As should be appreciated, while the performance of actions selected in box 810 as Workflow C may result in the loading and display of search results page 530, the information included within search results page 530 may sometimes be different than the information that was previously included within search results page 530 the last time that it was loaded and displayed. This is because the search results page 530 may sometimes be updated to include new or modified information or to remove previously displayed information. For example, certain features of the page 530 (e.g., text, images, links, etc.) may be added, removed or otherwise modified. Some examples of modifications to page features in a workflow will now be described in detail. In particular, FIG. 11 depicts an example in which search results page 530 is loaded and displayed as a result of execution of Workflow C. Search results page 530 of FIG. 11 is similar to search results page 530 of FIG. 5, with the exceptions that article link 541 of FIG. 5 has been removed from FIG. 11, while article link 1101 of FIG. 11 is a newly added article link that was not included in FIG. 5.

In some examples, a user may be interested to know when information displayed on a page has been modified since the last time that the user visited the page. For example, in some cases, a user may have already accessed each of article links 542-545 but may not yet have accessed article link 1101. Thus, in this example, the user may be interested to know that article link 1101 is a newly displayed link. In some examples, however, the user may not immediately recall that he has already accessed article links 542-525 or may not immediately appreciate that article link 1101 is a newly displayed link. In these and other examples, it may be advantageous to notify the user when information on a page has been modified, for example to increase efficiency and save time in recognizing and appreciating these modifications. In the example of FIG. 11, a box 1170 has been generated and displayed to indicate to the user that article link 1101 is a newly displayed link that was not previously displayed the last time that search results page 530 was loaded by web browser 125A. Additionally, box 1170 provides the user with the option of having article link 1101 be selected automatically by the browser (by selecting Yes button 1181) or not having article link 1101 be selected automatically by the browser (by selecting No button 1182). In some examples, in order to allow modifications to a page to be determined and indicated by the web browser 125A, information associated with a state of a web page may be collected and stored in association with its respective workflow within workflow information 127A. This state information may include information such as indications of elements (e.g., text, images, links, input elements, iframes, etc.) or features included on the webpage. In some examples, when a workflow is executed and the page is again loaded, state information for the page may again be collected the compared to the saved state information, for example in order to identify elements that are newly added or removed.

Figure 12:
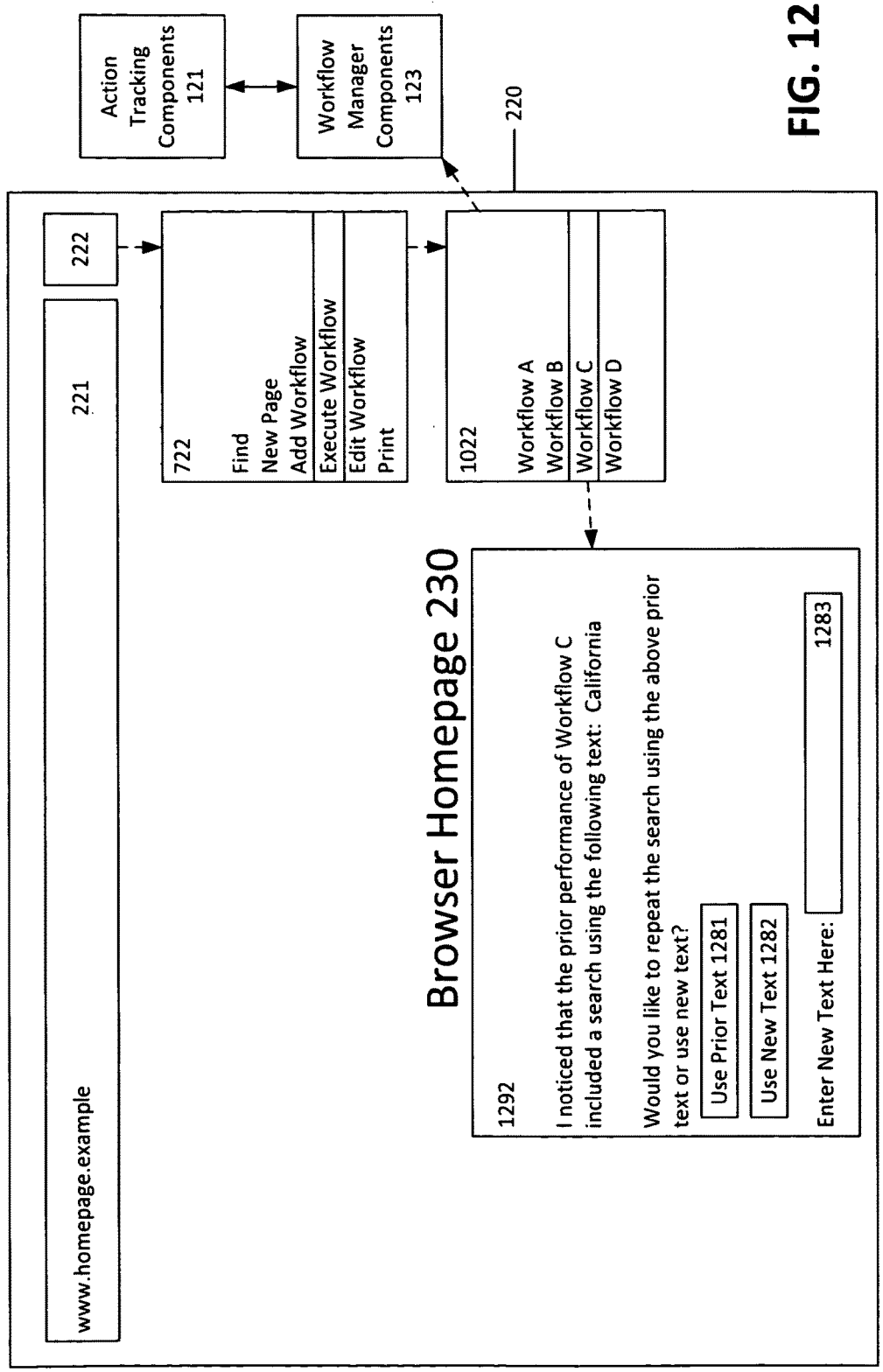
FIG. 12 is a diagram illustrating an example prompt for workflow changes that may be used in accordance with the present disclosure.

Additionally, in some examples, prior to executing a requested workflow, workflow manager components 123 may examine the actions associated with the workflow and prompt the user to determine whether the user wishes to make any changes to the workflow actions. Some example changes to actions relative to prior performances of a workflow may include changes to search terms, changes to page addresses entered into an address bar, changes to element selections, changes to identity authentication information, and many others. In particular, FIG. 12 depicts an example in which a user is prompted to determine whether the user wishes to repeat a workflow search using the same text that was used previously or using new and different text. As shown in FIG. 12, upon requesting execution of Workflow C from workflow selection sub-menu 1022, a box 1292 is displayed. Box 1292 indicates to the user that, upon a prior performance of Workflow C, a search was performed using the text "California." Box 1292 then gives the option of repeating the search using the prior text ("California") or using new text. To use the prior text, the user may select Use Prior Text button 1281. To use new text, the user may enter the new text into text input element 1283 and then select the Use New Text button 1282. Selecting and entering new text may cause the new text to be saved in workflow information 127A of FIG. 1 in association with Workflow C and may also cause Workflow C to be executed using the selected and entered new text.

In some examples, it may be advantageous to allow any of all information associated with a workflow to be transmitted to one or more server components. This may, for example, allow workflows to be requested for execution by devices other than the devices on which the workflows are originally generated. This may be advantageous by, for example, providing a user with greater flexibility to request and execute his generated workflows on multiple devices as well as potentially allowing other users on the same or different to devices to request and execute such workflows. In some examples, a workflow may be associated with a particular user account, for example that may be accessible using identity authentication information, such as a username and password. This may allow a user to generate and store workflows and to restrict access to such workflows to himself and/or to other authorized individuals. Referring back to FIG. 1, it is seen that server 150 includes web browser 125B, workflow components 120B, tracked action information 126B, and workflow information 127B. These components 120B, 126B, and 127B on server 150 may perform any or all of the above functionality and/or store any or all of the same information described above with respect to their counterpart components 120A, 125A, 126A, and 127A on client 110. In particular, although not specifically shown in FIG. 1, server workflow components 120B may, for example, include action tracking components, pattern matching components, and workflow manager components that may perform any or all of the same functionality described above with respect to counterpart components 121, 122 and 123 on client 110.

As also shown in FIG. 1, a number of connected devices 160A-N may communicate with server 150. In the particular example of FIG. 1, connected devices 160A-N include a voice activated device 160A, a television 160B, a smart phone 160C, other connected device 160N and any number of other additional or alternative connected devices. In some examples, any number of connected devices 160A-N may not include a web browser. It is noted, however, that even devices that do not include a web browser may nevertheless be capable of requesting execution of a workflow. For example, in some cases, voice activated device 160A may not include a web browser. However, in some examples, a user may nevertheless issue a voice command to voice activated device 160A to request execution of a particular workflow, such as Workflow C described above. The voice activated device 160A may then, for example, communicate with server 150 to request execution of the Workflow C. In some examples, server 150 may then perform Workflow C and return the results of the performance of workflow C (e.g., search results page 530 of FIG. 5) to a device that may include a web browser or that may otherwise be capable of displaying such results (e.g., television 160B, smart phone 160C, etc.). In other examples, if the results of a workflow include text, the text may be sent back and outputted as speech audio data by voice activated device 160A.

Figure 13:
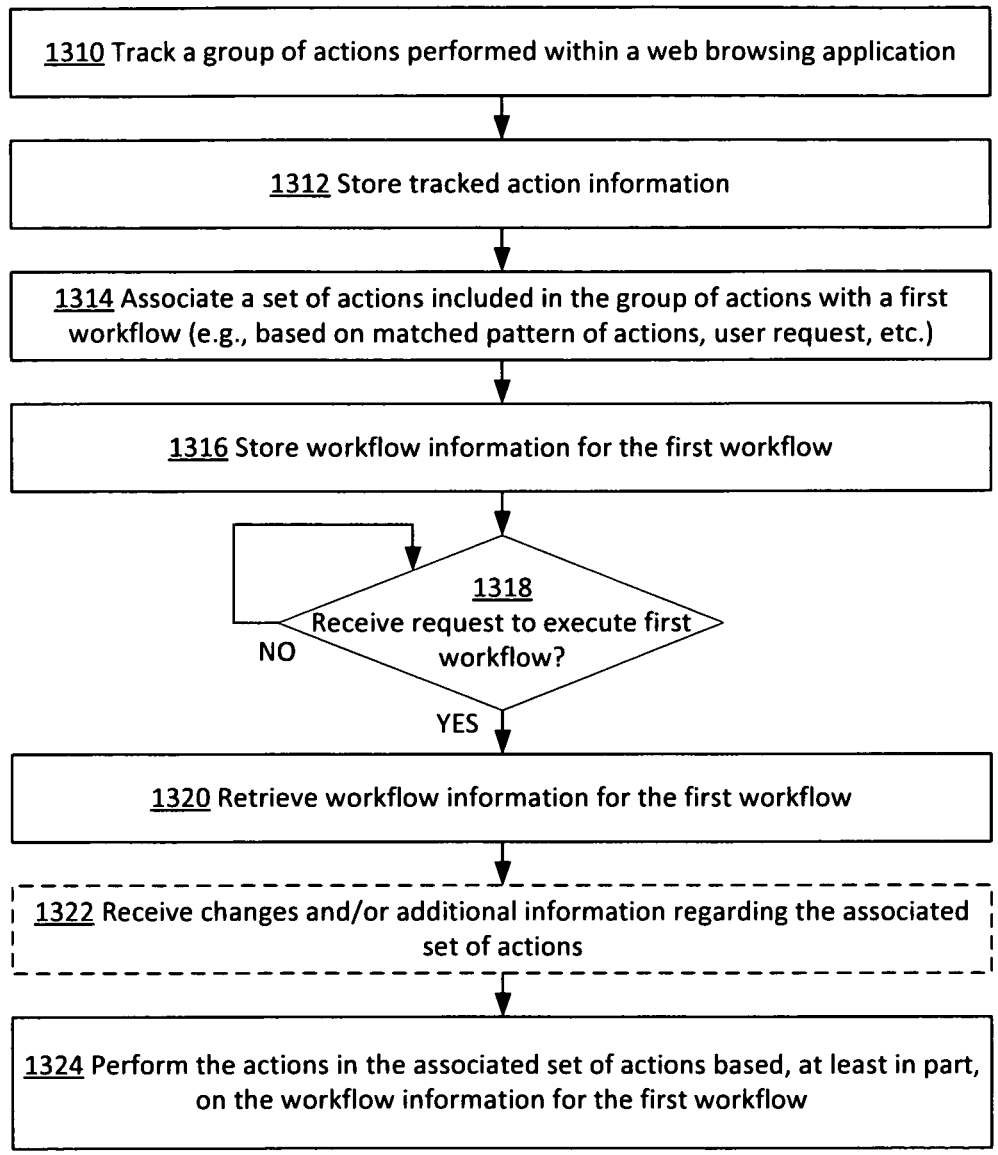
FIG. 13 is a diagram illustrating an example process for browser-based workflow implementation that may be used in accordance with the present disclosure.

FIG. 13 is a diagram illustrating an example process for browser-based workflow implementation that may be used in accordance with the present disclosure. As shown in FIG. 13, at operation 1310, a group of actions performed within a web browsing application are tracked, for example by action tracking components 121 of FIG. 1. As set forth above, the tracked actions may include actions such as entering a uniform resource locator (URL) or page address, loading a page, entering a search term, entering identity authentication information (e.g., username, password, etc.), selecting a link, selecting an input element (e.g., text input element, button, drop down menu, etc.), entering information using an input element, and other browser-associated actions. In some examples, the tracked actions may include user-performed actions (e.g., selecting a text input element and entering text therein) as well as browser-performed actions (e.g., loading a webpage). Some specific example tracked actions are depicted and described above with reference to FIGS. 2-5. As also set forth above, in some examples, the tracking of actions may include, for one or more tracked actions, collecting of information such as an action type (e.g., page loading, element selection, text or other information entry, etc.), an associated element (e.g., address bar, text input element, checkbox, button, etc.), associated entered information (e.g., entered text), a time associated with performance of the action, an order of performance of the action relative to one or more other actions in the group of actions, and other information.

At operation 1312, tracked action information is stored, for example as tracked action information 126A-B of FIG. 1. As set forth above, the stored tracked action information may include any or all of the information collected through tracking of the group of actions and/or other information. In some examples, the stored tracked action information may include an indication of the actions in the group of actions and an order of performance of the actions in the group of actions, such as an order of performance of each action in the group of actions relative to one or more other actions in the group of actions. Also, in some examples, the stored tracked action information may include, for one or more tracked actions, an action type, an associated element, associated entered text or other entered information, a time associated with performance of the action, and other information At operation 1314, a set of actions included in the tracked group of actions is associated with a first workflow. As set forth above, various different techniques may be employed to associate a set of actions with a workflow. In some examples, a set of actions may be associated with a workflow based, at least in part, on a determination that the set of actions is performed at least twice, such as depicted and described above with reference to FIG. 6. In some cases, various sets of tracked actions may be compared to one another to identity patterns, for example sets of tracked actions that are performed repeatedly (i.e., at least twice), such as at least twice in a day, week, or at any other selected frequencies and/or quantities. Also, in some examples, a set of actions may be associated with a workflow based, at least in part, on a user request to add or otherwise generate a workflow, such as depicted and described above with reference to FIG. 7. For example, in some cases, a user may perform actions within the browser, and, upon completion of performance of the actions, the user may request that the recently performed actions be associated with a workflow. In some examples, the set of actions associated with the first workflow may be at least partially selectable by a user. For example, such as depicted and described above with reference to FIG. 8, indications of recently performed actions including the actions in the set of actions may be displayed to the user, and these indications may be selectable to by the user to indicate an association with the first workflow. The user may then select the indications for each action in the set of actions, and receiving of these user selections may cause the set of actions to be associated with the first workflow.

The set of actions associated with the first workflow may include, for example, any or all types of tracked actions, such as entering a uniform resource locator (URL) or other resource locator, loading a page, entering a search term, entering identity authentication information (e.g., username, password, etc.), selecting a link, selecting an input element (e.g., text input element, button, drop down menu, etc.), entering information using an input element, and other browser-associated actions. In some examples, the set of actions may include loading one or more pages and performing one or more additional actions on the loaded pages (e.g., entering text for searching, usernames, passwords, input element selections, link selections, etc.).

At operation 1316, workflow information for the first workflow is stored, for example in workflow information 127A-B of FIG. 1. In some examples, the stored workflow information for the first workflow may include an indication of an association between the first workflow and its associated set of actions. Also, in some examples, the stored workflow information for the first workflow may include an indication of an order of performance of the actions in the associated set of actions, such as an order of performance of each action in the set of actions relative to one or more other actions in the set of actions. The order of performance for the actions in the set of actions may be determined based, at least in part, on the order of performance for the actions in the group of actions, which, as set forth above, may be included within the action tracking information stored at operation 1312. Also, in some examples, the stored workflow information for the first workflow may include, for one or more actions in the set of actions, an action type, an associated element, associated entered text or other entered information, and other information.

At operation 1318, it is determined whether a request is received to execute the first workflow. As set forth above, in some cases, a web browser may expose one or more controls, such as menu options, for requesting execution of a workflow, for example as depicted and described above with reference to FIG. 10. In some examples, a request to execute a workflow may be received by a different device than the device on which the actions associated with the workflow are tracked and/or the workflow was otherwise generated. Also, in some examples, as described above, execution of a workflow may be requested using devices that may not necessarily include a web browser, such as some voice activated devices. At operation 1320, upon receiving of a request to execute the first workflow, workflow information for the first workflow is retrieved at operation 1320. For example, operation 1320 may include retrieval of any or all of the information stored at 1316 and described above, such as an indication of the set of actions associated with the first workflow, an indication of the order of performance of the actions in the associated set of actions, and other information regarding the associated set of actions.

At operation 1322, changes and/or additional information regarding the associated set of actions are received. For example, as set forth above, a web browser may sometimes prompt a user to determine whether the user wishes to make any changes to workflow actions prior to execution of a workflow. Some example changes to workflow may include changes to search terms, changes to page addresses entered into an address bar, changes to element selections, changes to identity authentication information, and many others. As described in detail above, FIG. 12 depicts a specific example in which a user is prompted to determine whether the user wishes to repeat a workflow search using the same text that was used previously or using new and different text. Additionally, in some examples, additional information may be requested from a user prior to execution of a workflow. For example, as described above, personal information, such as usernames, passwords, and other identity authentication information, may sometimes be provided by a user when requesting a workflow as opposed to having such information be provided in advance and stored. This may sometimes help to protect the user's personal information and increase the user's peace of mind. Operation 1322 is shown in FIG. 13 using dashed lines to indicate that, in many cases, no changes and/or additional information may be requested and/or received. It is also noted that modifications to a set of actions associated with a workflow may be requested at any time after the set of actions are associated with the workflow (and not only upon execution of the workflow), such as by selecting an edit workflow option on browser options menu 722 of FIG. 7 (or other similar option) and described in detail above.

At operation 1324, the actions in the associated set of actions are performed based, at least in part, on the workflow information for the first workflow. In some cases, one or more components, such as workflow manager components 123 of FIG. 1, may cause a web browser, such as web browser 125A of FIG. 1, to perform the actions in the associated set of actions at operation 1324. In some examples, the actions in the associated set of actions may be performed based, at least in part, on the order of performance of the actions in the associated set of actions that may be included within the stored and retrieved workflow information for the first workflow. In some examples, the associated set of actions may be performed by the same web browsing application in which the actions were previously performed and tracked. Also, in some examples, the associated set of operations may be performed by one or more different web browsing applications from the web browsing application in which the actions were previously performed and tracked, such as web browsing applications on different devices or nodes. In some examples, such as described above with reference to FIG. 11, the set of actions may include loading of a page, and the web browser or other components may determine at least one modification to the page relative to a previous loading of the page, such as the adding or removing of one or more links or other page elements. A message may then be provided that indicates the modification and allows the user to request that an action be performed in association with the modification (e.g., selecting of a newly displayed link, etc.).

In some examples, when a user navigates to a particular webpage, the user may sometimes be presented with an option to select one or more pre-configured workflows that are associated with the webpage. For example, these pre-configured workflows may include workflows that have been generated by other web browsers and/or users and that include one or more actions associated with the particular webpage. In some cases, actions may be tracked in a first web browser to generate a workflow that is used in the first web browser. The workflow may then be saved as a pre-configured workflow that is made available to one or more other web browsers when the one or more other web browsers load a webpage associated with the workflow. In some cases, information associated with pre-configured workflows may sometimes be stored in workflow information 127A-B of FIG. 1. Upon selection of a pre-configured workflow, the user may sometimes be given the opportunity to change, add, and/or delete actions associated with the pre-configured workflow, for example using an interface such as box 810 of FIG. 8. The selected workflow may be added to a list of workflows that the user may select for execution, such as shown in workflow selection sub-menu 1022 of FIG. 10.

Additionally, in some examples, modifications may be made to one or more actions associated with a workflow based, at least in part, on factors such as the contents of one or more webpages associated with the workflow, a time of day at which the workflow is executed, a geographic region in which a user and/or device is located, and other factors. For example, in some cases, a particular webpage may expose certain links only at certain times of day. For example, a restaurant webpage may expose a daily breakfast menu link only during morning hours and a daily dinner menu link only during evening hours. In some cases, a workflow may be configured to load the restaurant webpage, to determine whether the daily breakfast menu link or the daily dinner menu link is exposed on the webpage, and to select one of those two links that is exposed on the webpage.

Furthermore, in some examples, a particular workflow may sometimes be requested for execution on different pages that include similar or related content. For example, in some cases, a first webpage and a second webpage may include similar input elements, such that similar actions may be performed on the first and second webpages. In these and other cases, a single workflow may sometimes be generated that may be executed on the first webpage, the second webpage, and any number of additional similar webpages.

In yet other examples, a user may sometimes request that a particular workflow be executed at least twice using one or more different input values. For example, in some cases, a user may request that a workflow be performed repeatedly for a collection of ten widgets having different identification numbers that are entered into a particular input element. In some examples, an option may be provided that allows a user to provide a single request for ten separate executions of the workflow, thereby saving the user from having to enter ten separate requests for execution of the workflow. Along with the single request, the user may indicate the ten different identification numbers for each of the ten widgets. The web browser may then perform the workflow ten times, each time entering a different widget identification number into the particular input element.

In some examples, any or all of the browser-based workflow functionality described herein may be provided as a service. For example, this service may be integrated with any web browser by the browser using application programming interface (API) calls to perform various operations, such as any or all of the operations included in FIG. 13. In some examples, any or all of the tracking of actions, the storing of tracked action information, the associating of actions with a workflow, the storing of workflow information for the workflow, the receiving of a request to execute the workflow, and the causing of a web browsing application to perform the actions in the associated set of actions based at least in part on workflow information for the workflow may be performed, at least in part, by one or more services. A service may, for example, execute on one or more servers, such as server 150 of FIG. 1, which may, for example, include or access workflow components 120B, tracked action information 126B and/or workflow information 127B. In some examples, a web browser may issue one or more API calls to report various actions tracked within the web browser to a service and/or to request tracking of actions by the service. The tracked actions and their associated information, such as their order of performance, may be stored by the service, such as in tracked action information 126B of FIG. 1. Also, in some examples, the service may examine tracked action information to identify sets of actions that are performed at least twice, and the service may provide information regarding these repeated sets of actions back to a web browser. Also, in some examples, one or more API calls may be issued to cause the service to associate a set of tracked actions with a workflow and to store information associated with the workflow, such as indications of the associated actions, their order of performance, and other information. The information associated with the workflow may be stored by the service, for example in workflow information 127B. Furthermore, in some examples, when a request is received to execute a workflow, one or more API calls may be issued to the service to request information associated with the workflow, such as indications of the associated actions, their order of performance, and other information. In some examples, the providing of this information by a service may cause a web browser to execute the workflow and perform the associated set of actions.

Additionally, in some cases, any or all of the browser-based workflow functionality described herein may be provided using one or more browser plug-in components and/or other additional components included within or otherwise associated with a web browser. For example, in some cases, any or all of workflow components 120A may be at least partially included within or implemented using one or more browser plug-in components. In particular, any of all of action tracking components 121, pattern matching components 122, and/or workflow manager components 123 may be at least partially included within or implemented using one or more browser plug-in components. Also, in some cases, one or more browser plug-in components may communicate with a service, such as described above, to provide the browser-based workflow functionality described herein. For example, browser plug-in components may issue and/or provide information for issuing various API calls to a service for execution such as described above. Also, in some cases, the browser plug-in components may be capable of receiving and processing one or more API calls, such as any of those described above. In some examples, any or all of the tracking of actions, the storing of tracked action information, the associating of actions with a workflow, the storing of workflow information for the workflow, the receiving of a request to execute the workflow, and the causing of a web browsing application to perform the actions in the associated set of actions based at least in part on workflow information for the workflow may be performed, at least in part, by one or more browser plug-in components.

Figure 14:
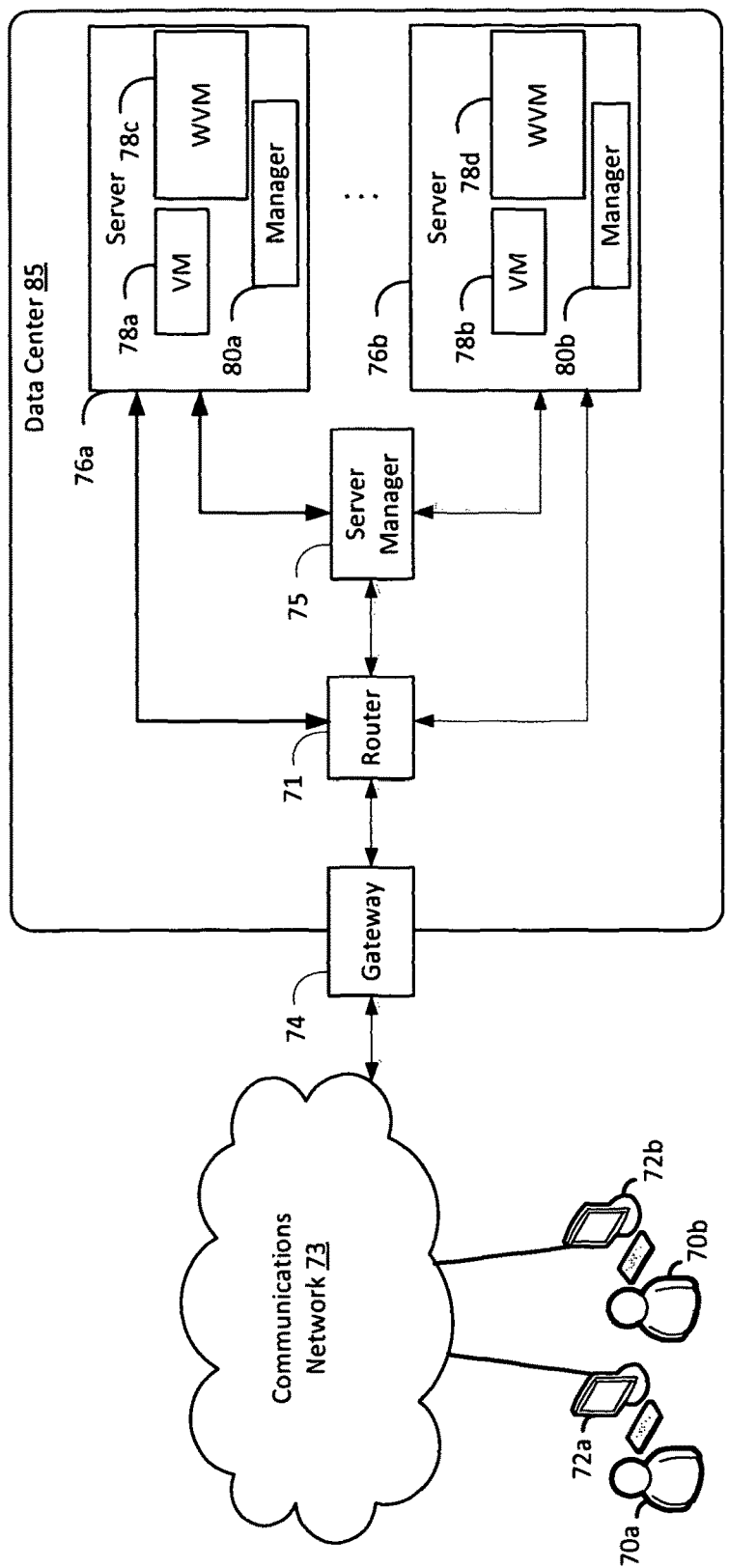
FIG. 14 is a diagram illustrating an example system for transmitting and providing data that may be used in accordance with the present disclosure.

An example system for transmitting and providing data, such as data associated with one or more electronic documents, will now be described in detail. In particular, FIG. 14 illustrates an example computing environment in which the embodiments described herein may be implemented. FIG. 14 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). Virtual machine instances 78c and 78d are workflow ("WVM") instances. The WVM virtual machine instances 78c and 78d may be configured to perform all, or any portion, of the browser workflow implementation techniques and/or any other of the disclosed techniques in accordance with the present disclosure and described in detail above. As should be appreciated, while the particular example illustrated in FIG. 14 includes one WVM virtual machine in each server, this is merely an example. A server may include more than one WVM virtual machine or may not include any WVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 14, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 14 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 14, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 14, a server manager 75 is also employed to at least in part direct various communications to, from and/or between servers 76a and 76b. While FIG. 14 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 14 has been greatly simplified and that many more networks and networking devices may be utilized to interconnect the various computing systems disclosed herein. These network topologies and devices should be apparent to those skilled in the art.

It should also be appreciated that data center 85 described in FIG. 14 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 15:
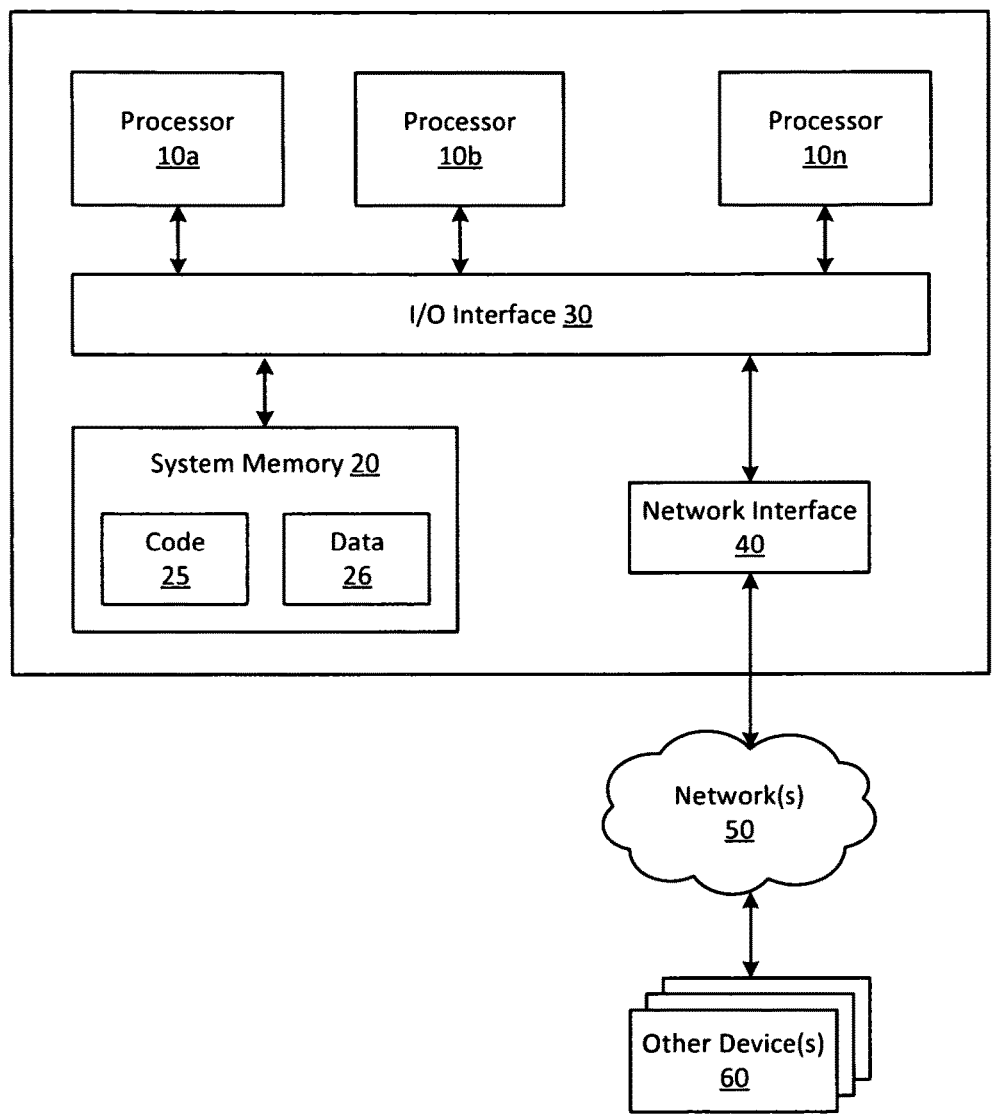
FIG. 15 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 15 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for browser-based workflows comprising:
    one or more processors; and
    one or more memories having stored therein instructions that, upon execution by the one or more processors, cause the computing system perform operations comprising:
        tracking a group of actions performed within a web browsing application;
        storing first information indicating actions in the group of actions and an order of performance of the actions in the group of actions;
        comparing a plurality of sets of actions included in the group of actions that are tracked;
        identifying, based at least in part on the comparing, a first set of actions that is repeated at least a specified number of times within a specified time period;
        associating the first set of actions with a workflow based at least in part on the first set of actions being repeated at least the specified number of times within the specified time period;
        storing second information indicating an association between the workflow and the first set of actions and indicating an order of performance of the first set of actions;
        receiving a request to execute the workflow; and
        causing the web browsing application to perform, based at least in part on the second information, the first set of actions.

2. The computing system of claim 1, wherein the first set of actions comprises at least one of entering a resource locator, entering a search term, entering identity authentication information, selecting a link, selecting an input element, or entering information using the input element.

3. The computing system of claim 1, wherein at least one of the tracking, the storing first information, the associating, the storing second information, the receiving the request, and the causing are performed, at least in part, by one or more services.

4. The computing system of claim 1, wherein at least one of the tracking, the storing first information, the associating, the storing second information, the receiving the request, and the causing are performed, at least in part, by one or more browser plug-in components.

5. A method for browser-based workflow implementation comprising:
    tracking a group of actions performed within a web browsing application;
    storing first information indicating actions in the group of actions and an order of performance of the actions in the group of actions;
    comparing a plurality of sets of actions included in the group of actions that are tracked;
    identifying, based at least in part on the comparing, a first set of actions that is repeated at least a specified number of times within a specified time period;
    associating the first set of actions with a workflow based at least in part on the first set of actions being repeated at least the specified number of times within the specified time period;
    storing second information indicating an association between the workflow and the first set of actions and indicating an order of performance of the first set of actions;
    receiving a request to execute the workflow; and
    performing, by the web browsing application, based at least in part on the second information, the first set of actions.

6. The method of claim 5, wherein the first set of actions comprises at least one of entering a resource locator, entering a search term, entering identity authentication information, selecting a link, selecting an input element, or entering information using the input element.

7. The method of claim 5, wherein the first set of actions comprises performing one or more actions on a page.

8. The method of claim 5, wherein the first set of actions associated with the workflow is at least partially selectable by the user.

9. The method of claim 5, wherein the request to execute the workflow is received by a different device than a device on which the group of actions are tracked.

10. The method of claim 5, further comprising, after associating the first set of actions with the workflow, modifying at least one action in the first set of actions.

11. The method of claim 10, comprising modifying the at least one action in the first set of actions based, at least in part, on contents of a page.

12. One or more non-transitory computer-readable storage media having stored thereon instructions that, upon execution by one or more compute nodes, cause the one or more compute nodes to perform operations comprising:
    tracking a group of actions performed within a web browsing application;
    storing first information indicating actions in the group of actions and an order of performance of the actions in the group of actions;
    comparing a plurality of sets of actions included in the group of actions that are tracked;

identifying, based at least in part on the comparing, a first set of actions that is repeated at least a specified number of times within a specified time period;

associating the first set of actions with a workflow based at least in part on the first set of actions being repeated at least the specified number of times within the specified time period;

storing second information indicating an association between the workflow and the first set of actions and indicating an order of performance of the first set of actions;

receiving a request to execute the workflow; and performing, by the web browsing application, based at least in part on the second information, the first set of actions.

13. The one or more non-transitory computer-readable storage media of claim 12, wherein the first set of actions comprises at least one of entering a resource locator, entering a search term, entering identity authentication information, selecting a link, selecting an input element, or entering information using the input element.

* * * * *